United States Patent
Keramidis

(10) Patent No.: US 6,830,418 B2
(45) Date of Patent: Dec. 14, 2004

(54) VEHICULAR CARGO RETENTION SYSTEM

(76) Inventor: Bill V. Keramidis, 2365 Big Thompson, P.O. Box 1649, Estes Park, CO (US) 80517

( * ) Notice: Subject to any disclaimer, the term of this patent is extended or adjusted under 35 U.S.C. 154(b) by 0 days.

(21) Appl. No.: 10/133,021

(22) Filed: Apr. 26, 2002

(65) Prior Publication Data

US 2002/0197128 A1 Dec. 26, 2002

Related U.S. Application Data

(60) Provisional application No. 60/286,851, filed on Apr. 26, 2001.

(51) Int. Cl.[7] .................................................. B60P 7/08
(52) U.S. Cl. .......................... 410/38; 410/34; 410/143; 410/151
(58) Field of Search ............................. 410/34, 35, 38, 410/39, 40, 143, 151; 248/231.1, 316.1, 500; 224/403, 535, 536, 42.38, 558, 570, 569

(56) References Cited

U.S. PATENT DOCUMENTS

| | | | | |
|---|---|---|---|---|
| 710,639 A | * | 10/1902 | Vickers | 410/38 |
| 1,644,279 A | * | 10/1927 | Romine | 410/35 |
| 2,855,217 A | * | 10/1958 | Bagwell | 410/32 |
| 3,446,515 A | * | 5/1969 | Julian, Jr. | 410/38 |
| 4,121,849 A | * | 10/1978 | Christopher | 410/38 |
| 4,236,854 A | * | 12/1980 | Rogers | 410/121 |
| 4,507,033 A | | 3/1985 | Boyd | 410/104 |
| 4,650,383 A | * | 3/1987 | Hoff | 410/149 |
| 5,338,136 A | * | 8/1994 | Hetchler | 410/100 |
| 5,427,487 A | * | 6/1995 | Brosfske | 410/121 |
| 5,697,742 A | | 12/1997 | House | 410/127 |
| 5,800,145 A | | 9/1998 | Kelce | 410/142 |
| 5,839,865 A | | 11/1998 | Schmidt | 410/127 |
| 5,865,580 A | | 2/1999 | Lawrence | 410/118 |
| 5,971,685 A | * | 10/1999 | Owens | 410/151 |
| 6,068,433 A | * | 5/2000 | Baloga | 410/145 |
| 6,168,359 B1 | * | 1/2001 | Smith | 410/38 |
| 6,193,452 B1 | * | 2/2001 | Skiba | 410/38 |
| 6,227,781 B1 | * | 5/2001 | Smith et al. | 410/151 |
| 6,582,169 B1 | * | 6/2003 | Cano-Rodriguez et al. | 410/128 |
| 6,632,055 B2 | * | 10/2003 | Kania | 410/38 |

* cited by examiner

Primary Examiner—Stephen Gordon
(74) Attorney, Agent, or Firm—Santangelo Law Offices, P.C.

(57) ABSTRACT

A system including apparatus and methods for compressively retaining cargo to a vehicular surface may, upon adjustment, frictionally engage the underside of the upper lip of a truck bed sidewall and transmit a compressive force to a cargo retention element positioned substantially above vehicular cargo. A vertical compression force enhancement element, which may be the same as an adjustable vertical compression force transfer element, may be a threaded rod and threadably mated nut system. The invention also discloses an extendable vertical compression force base element to fit differently sized truck beds, for example.

40 Claims, 15 Drawing Sheets

US 6,830,418 B2

VEHICULAR CARGO RETENTION SYSTEM

This application claims the benefit of U.S. Provisional Patent Application No. 60/286,851, filed Apr. 26, 2001, hereby incorporated by reference herein.

I. BACKGROUND OF THE INVENTION

Generally the invention relates to holding down cargo in the cargo bed of any size, make, or model pick-up truck, or other vehicular surface that is capable of supporting cargo. It can be used with or without the use of a canopy or any other type of cover. Specifically, the invention focuses upon the use by people in the construction business or any other persons who use their pick-up trucks or vehicle for any other type of cargo, transport. Further, at least one embodiment of the invention relates to an easily installable and removable vertical compression force-based vehicular cargo retention apparatus that may be fully adjustable to accommodate cargo of different size and to fit vehicles with differently sized cargo beds or surfaces.

Possibly one of the biggest problems in transporting cargo may be that there may, from some perspectives, be nothing sufficiently strong, secure, and easy to use, especially for those in the construction field, to effectively hold down cargo in the bed of a pick-up truck without causing damage to the materials being held down (generally the cargo) or to the vehicle. As examples, problems can exist with cargo hold down/supports while driving down the highway or any drivable surface.

After one sees broken drywall and other building materials or Christmas trees, as but a few examples, on the road which have blown off the back of trucks, the importance of securely retaining and transporting cargo is apparent. A few specific examples of problems in vehicularly transporting cargo include damage to cargo resulting from movement of cargo relative to the cargo supporting surface, damage to supporting surfaces or other vehicle parts incurred due to motion of cargo relative to supporting or surrounding structural surfaces, impairment of vehicular maneuverability and speed due to a vehicle operator's insecurity as to the integrity of the cargo securing (or retention) apparatus at higher speeds or at sharper curves, for example, and increased risk of damage and injury to persons and property proximate to an insufficiently or improperly retained cargo transport operation (including increased risk of incurring legal liability to injured parties or property owners). Cargo merely confined, as in some commercially available systems, may not be sufficiently retained without proper compressive force application to the cargo. Other problems relate to costs of presently commercially available cargo hold down apparatus that are prohibitively high for, for example, individual vehicle owners who desire to transport and safely retain smaller amounts of cargo. Still other problems with presently commercially available vehicular cargo retention products has to do with an installation that requires bolting or potentially deforming clamping, e.g., of the product to a vehicle part.

II. SUMMARY OF THE INVENTION

In at least one embodiment, the invention may disclose a structural framework system that may be used to retain through a vertical compression force items (more generally cargo) for transport. It may disclose a substantially elongated and rigid upper bar (a type of vertical compression force base element), two vertical compression force transfer elements that each contact the compression force base element and that each comprise a threaded rod and nut adjustment system that may also serve as a compression force enhancement element for use after positional adjustment, a cargo retention element that is connected with the two vertical compression force transfer elements, and two engagement elements that helps to fixedly establish the entire framework to a vehicle such as, for example, a pickup truck. In at least one embodiment of the invention, the vertical compression force is what results in secure cargo retention. In at least one embodiment, engagement elements each frictionally engages an underside of a truckbed sidewall upper lip underside through a compressive force.

This device offers advantages to the transporting of cargo in the bed of a pick-up truck, or on or in a supporting surface of any other type of vehicle. In a basic form, one broad goal of the concept or device involves taking any number, any size, any weight, or length of items (generally known as cargo) such as, but not limited to, drywall, PVC pipe, paneling, boards and equipment such as ladders scaffolding and household appliances, or even a family's Christmas tree (as but a few examples), and protecting them from flying, falling, or tipping over or out of the bed of the truck, or sustaining any unwanted motion relative to the cargo supporting surface (such as a pickup truck bed, e.g.). Of course, the term vehicular cargo as may be used herein refers generally to cargo being supported and transported with a vehicle.

Another goal of the cargo hold-down apparatus (at times referred to as the device or invention) is to prevent damage to the top of the tailgate from items too long for the truck bed, as the device can be used with the tailgate down.

Aware of the possibility of bodily injury due to a vehicle accident, the liability that it could cause, the loss or damage of expensive materials, equipment, or other items loaded and not held down securely, this device presents a better way to transport and hold cargo in place in a truck bed without damaging the truck and without the loss or damage of the items being transported. The product (or device) could prevent motion of the cargo relative to the cargo supporting surface from occurring by vertically compressively supporting and holding down or bracing (or retaining) cargo in the back of a pick-up truck, thereby precluding or avoiding injury to persons and/or damage to property.

Another broad goal of the invention may be to provide a cargo retention unit that may be installed without bolting or clamping, each of which may result in permanent structural modification of the vehicle.

Naturally, further objects of the invention are disclosed throughout other areas of the specification and claims.

III. BRIEF DESCRIPTION OF THE FIGURES

IV. DETAILED DESCRIPTION OF THE PREFERRED EMBODIMENTS

Figure 1:
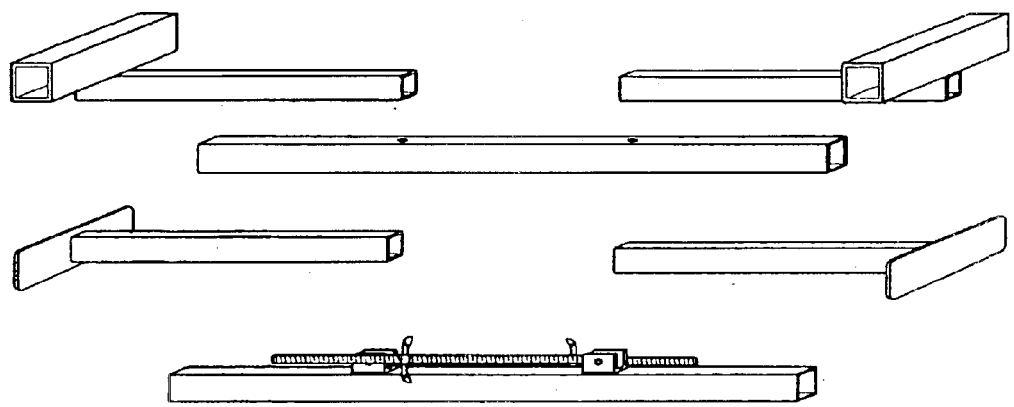
FIG. 1 shows the Cargo Hold Down and Support (or Truck Bed Cargo Retention System) unassembled.
Figure 2:
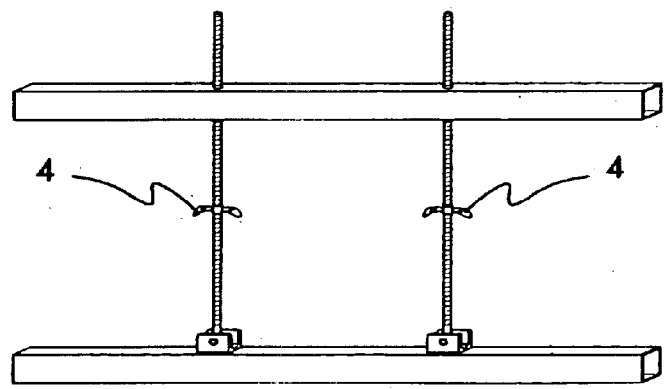
FIG. 2 shows an embodiment of the Invention assembled and laying on its side.
Figure 4:
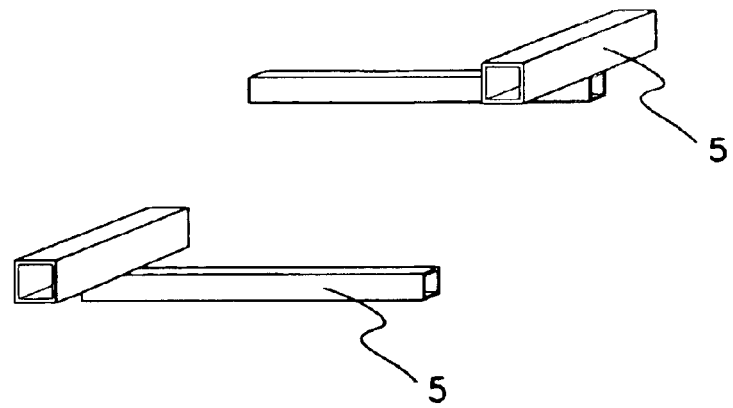
FIG. 4 shows the end bracket (or generally the engagement element) which may engage a lip underside of a truck bed sidewall.
Figure 5:
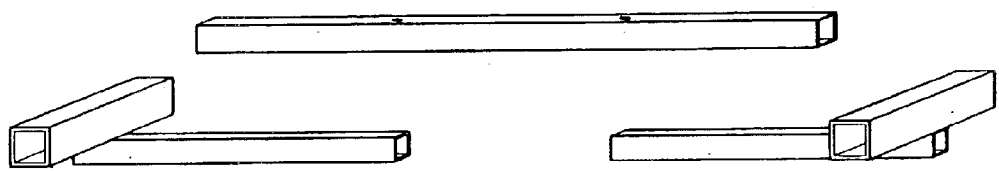
FIG. 5 shows the hollow tubing that may be used in an embodiment of the invention as, e.g., the compression force base element.
Figure 6:
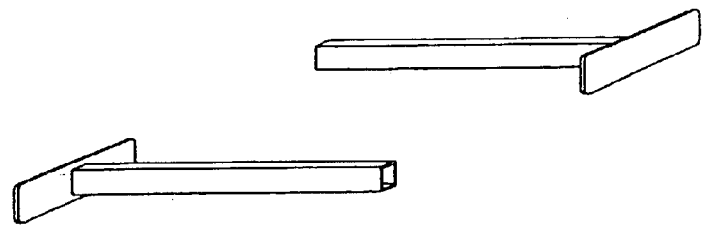
FIG. 6 shows the tubing (specifically the extension tubing) used in the bottom portion of an embodiment of the invention (the cargo retention element).
Figure 7:
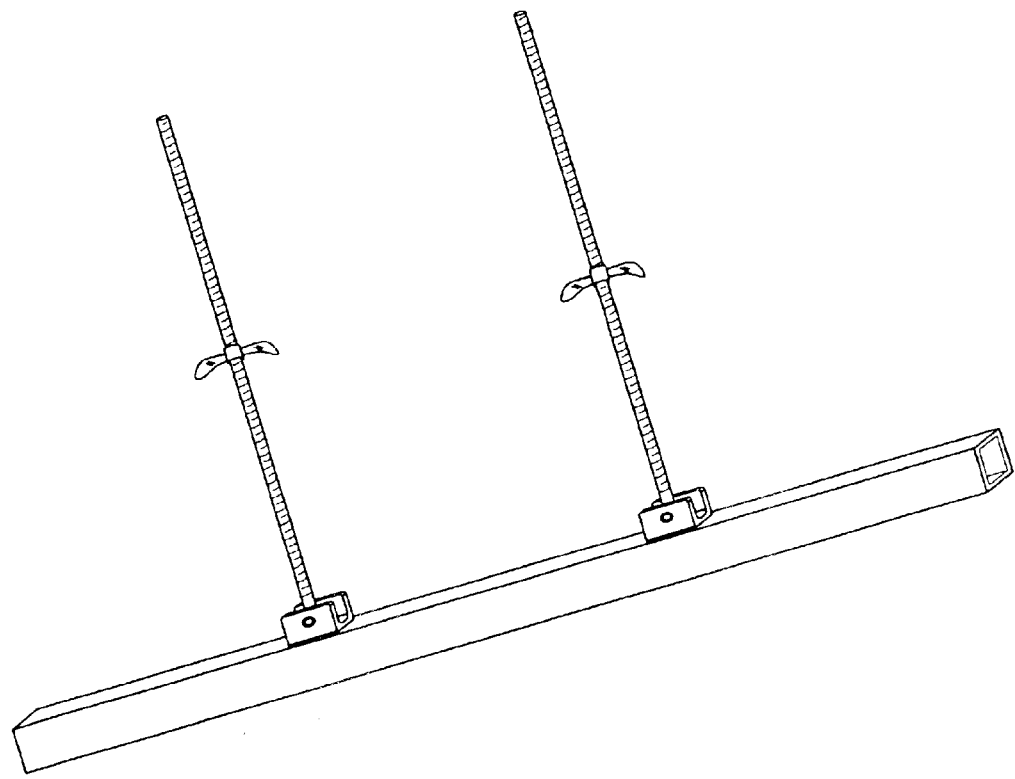
FIG. 7 shows the bottom tubing (generally the compression force base element) with at least one threaded rod (generally, the Vertical Compression Force Transfer Element).
Figure 8:
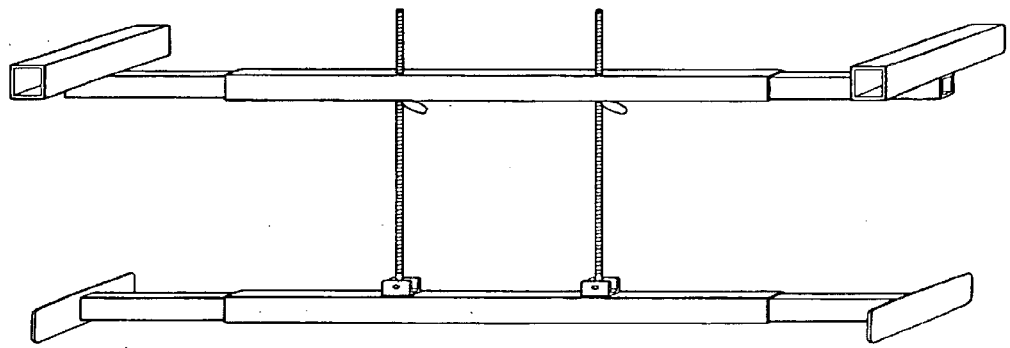
FIG. 8 shows an embodiment of the Invention.
Figure 9:
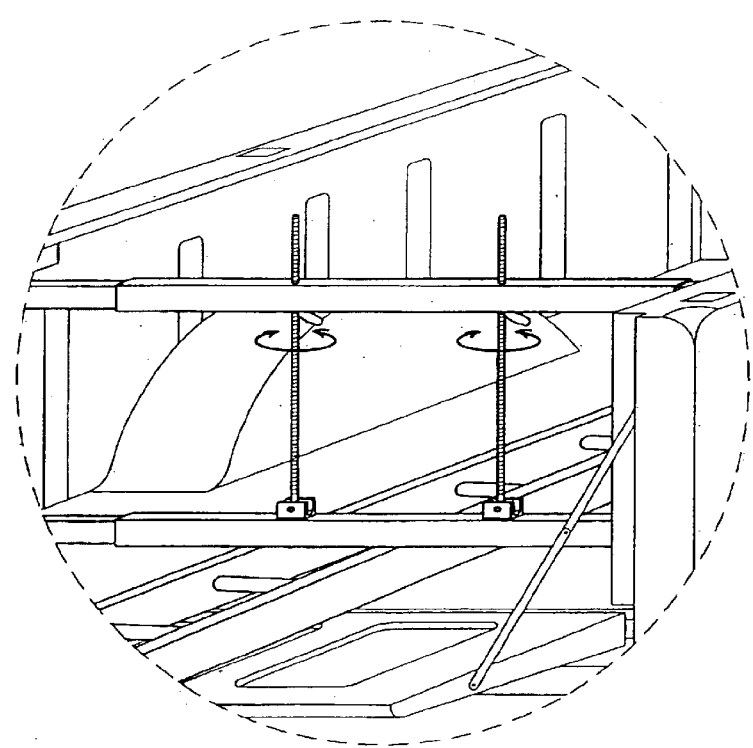
FIG. 9 shows installation of the Invention to hold a ladder in place on the bed of a pick-up truck.
Figure 10:
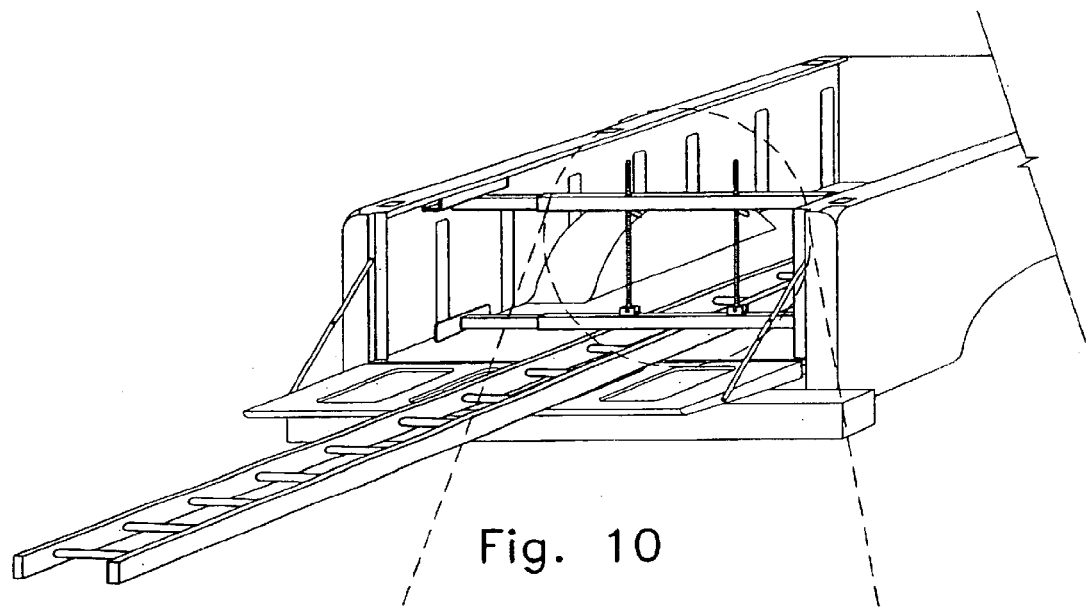
FIG. 10 shows an embodiment of the Invention in place holding a ladder on bed of truck.
Figure 11:
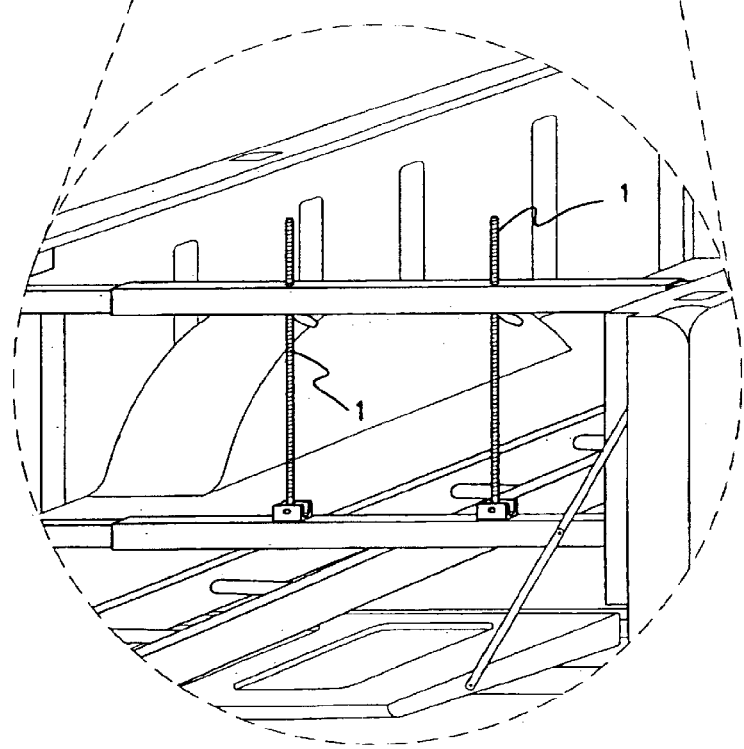
FIG. 11 shows a different angle of an embodiment of the invention and a ladder in place.
Figure 12:
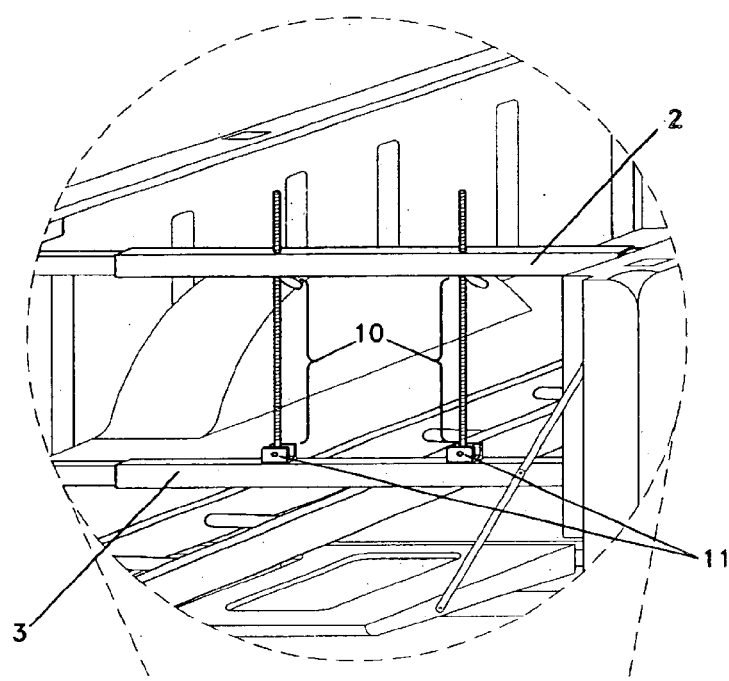
FIG. 12 shows a close up angle diagram of the device holding a ladder.
Figure 13:
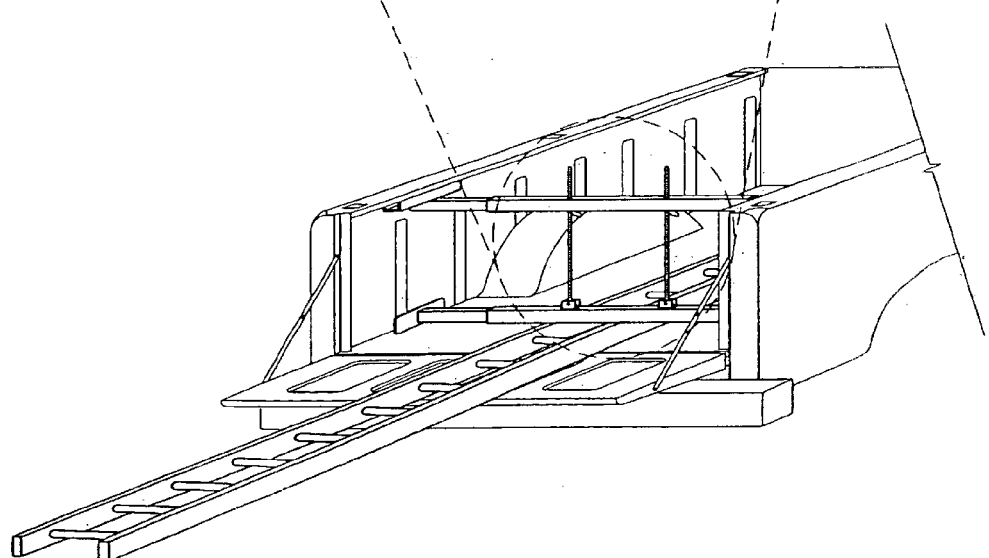
FIG. 13 shows different angle diagram of an embodiment of the invention holding a ladder on bed of pick-up truck.
Figure 14:
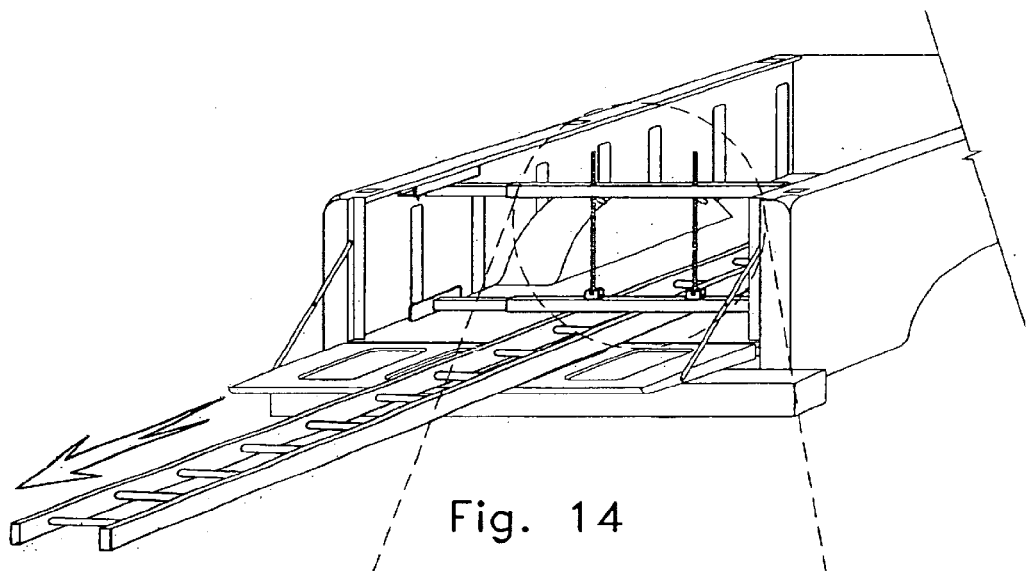
FIG. 14 shows a force being applied to a ladder while the ladder is held down and in place by an embodiment of the invention on bed of truck.
Figure 17:
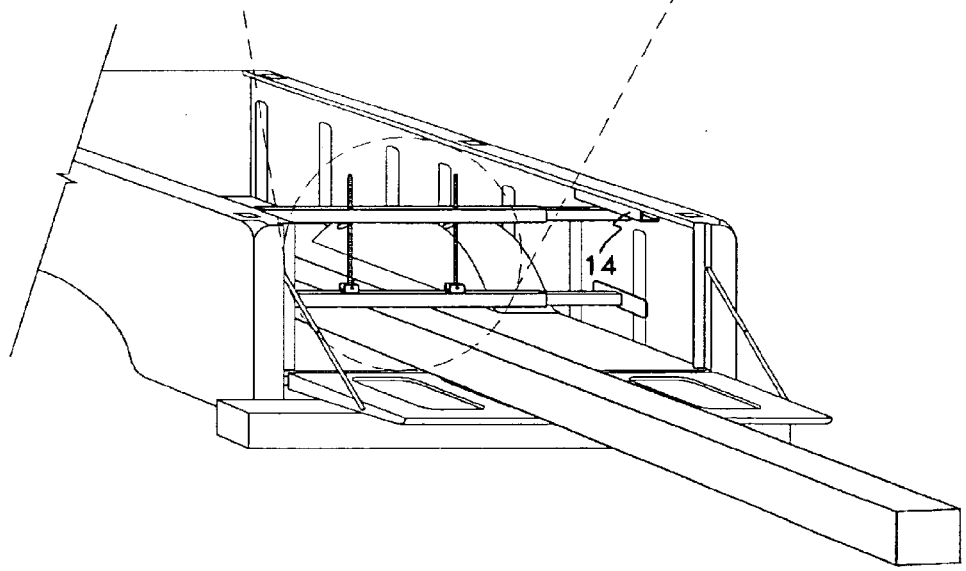
FIG. 17 shows a rear to front view diagram of the bed of the truck with an embodiment of the invention in place and holding down a post.
Figure 18:
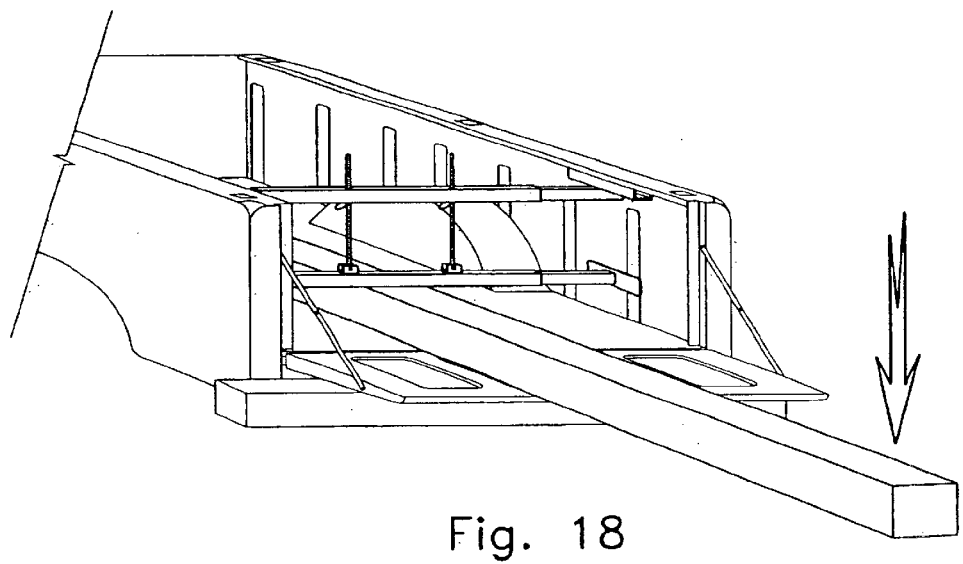
FIG. 18 shows a force applied to the end of a post retained by an embodiment of the invention.
Figure 19:
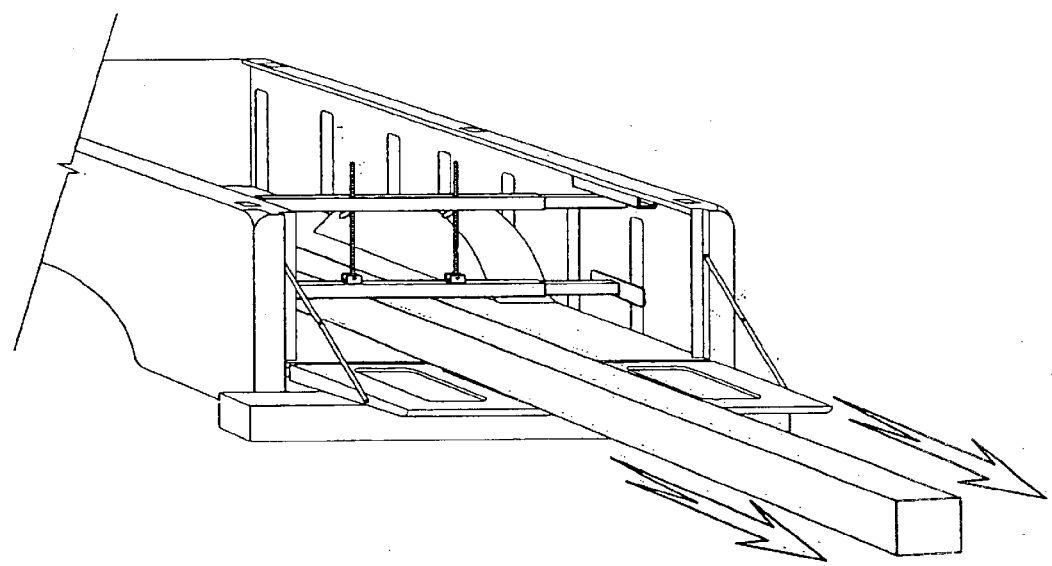
FIG. 19 shows a force applied on the post from the rear of pick-up while the post is being held in bed of truck by an embodiment of the invention.
Figure 20:
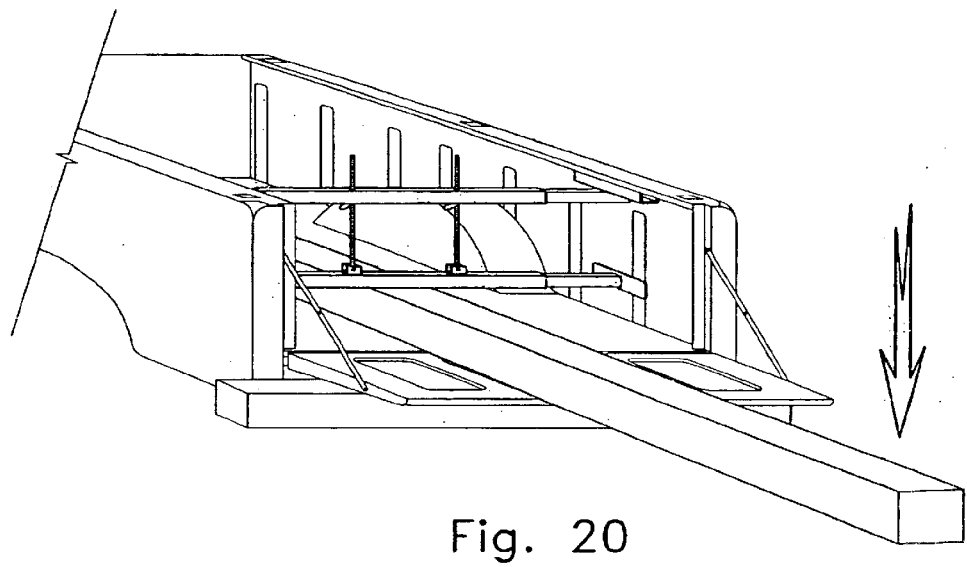
FIG. 20 shows a force applied to a post while the post is being held down and supported by an embodiment of the invention.
Figure 21:
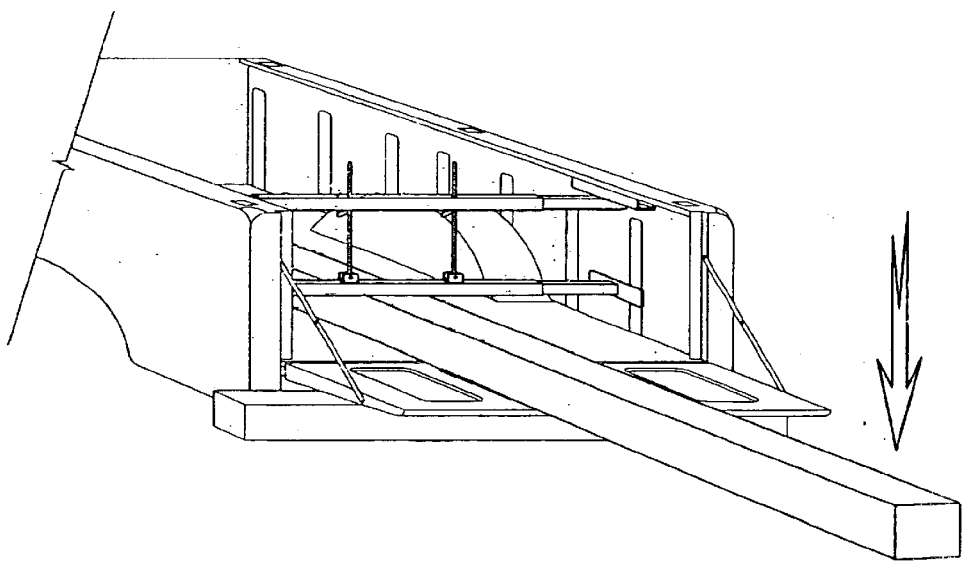
FIG. 21 shows a force applied to a the end of the post supported by an embodiment of the invention.
Figure 22:
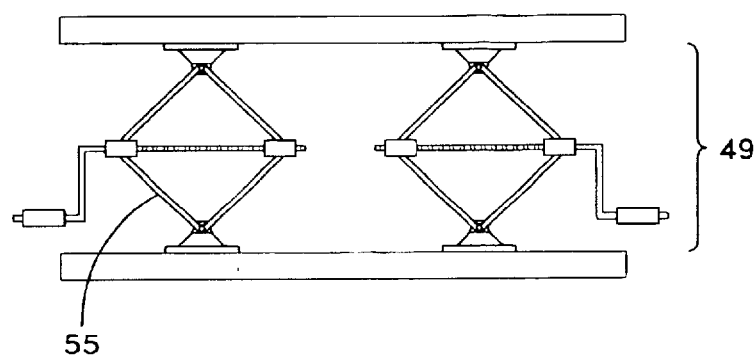
FIG. 22 shows a diagram of two types of mechanical elevation (or height-adjustment) mechanisms, including a scissors-type jack and a farmer jack, used as the adjustable releasable vertical compression force transfer element and comprising the vertical compression force enhancement element for at least one type of embodiment.
Figure 22:
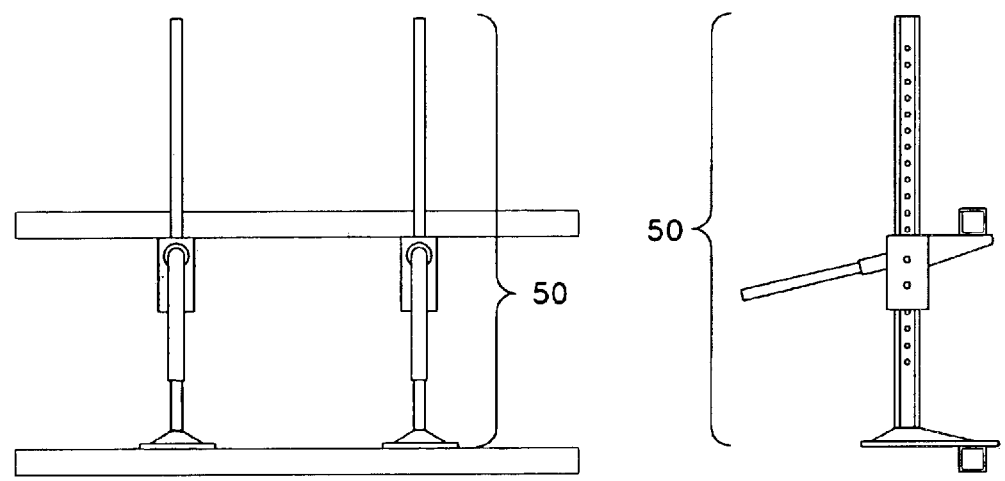

The present invention includes a variety of aspects that may be combined in different ways. At least one embodiment of the invention (termed the basic apparatus) may be a vehicular cargo retention apparatus that may comprise at least one engagement element (a general term for what may in at least one embodiment be part #5 as shown in FIG. 4) configured to be responsive to at least one vehicle part; a vertical compression force base element (a general term for what may in at least one embodiment be part #2 as shown in FIG. 12) responsive to the at least one engagement element; at least one releasable vertical compression force transfer element (a general term for what may in at least one embodiment be part #1 as shown in FIG. 11) pressuredly responsive to the vertical compression force base element; a vertically compressive cargo retention element (a general term for what may in at least one embodiment be part #3 as shown in FIG. 12) pressuredly responsive to the at least one releasable vertical compression force transfer element; and at least one vertical compression force enhancement element (a general term for what may in at least one embodiment be part #4 as shown in FIG. 2) to which the vertically compressive cargo retention element is compressively responsive. The at least one engagement element may engage a part of the vehicle such as the underside of the upper lip of a truck bed sidewall (see part 14 of FIG. 17); by engage it is meant generally not move relative to. The term vehicle as used herein is not limited to motorized vehicles, and may include non-motorized trailers or any device that is movable under an operator's control and that has a cargo-loadable surface. The engagement element may also engage a different vehicle part, such as the underside of a flat bed trailer, e.g. The vertical compression force base element may be as part #2 in FIG. 12, e.g. or it may even be simply a bolt that connects a releasable compression force transfer element to the engagement element. The vertical compression force base element and the releasable vertical compression force transfer element could possibly be one in the same in at least one embodiment of the invention; the engagement element will always be a separate part because its definition encompasses even simply surfaces of other elements that contact or in some way engage a vehicle part. The vertical compression force base element may be viewed as a backbone of the invention's framework and may play a key role in providing and maintaining the compressive force that retains cargo. The releasable vertical compression force transfer element may be a structure that, at least conceptually, may transfer a vertical compression force from the base element to the vertically compressive cargo retention element. It is termed releasable because the force that it transfers (or maintains or sustains) may be eliminated upon manipulation of the transfer element(s) (or another responsive element). It is this releasability that allows for "depressurization" of the apparatus and the eventual removal of the cargo. The vertically compressive cargo retention element may compressively contact the cargo against an underlying surface such as a truck bed, thereby compressively retaining it. The vertical compression force enhancement element may be maninulated to enhance the vertical compression force transferred by the adjustable vertical compression force transfer element. This extra compression may be necessary to sufficiently retain cargo.

The at least one releasable vertical compression force transfer element of the basic apparatus may be at least one adjustable releasable vertical compressive force transfer element (a general term for what may in at least one embodiment be part #10 as shown in FIG. 12). This at least one adjustable releasable vertical compressive force transfer element may provide what may be referred to as coarse adjustment; essentially the adjustable transfer element may be manipulated to positionally adjust the cargo retention element above or on top of cargo to be retained. It may be viewed primarily as a position-related element, and the compression force enhancement element may be viewed primarily as a compression-related element (although both may provide a degree of each). A user may first positionally adjust the cargo retention element using the at least one vertical compression force transfer element so that the cargo retention element is atop or above the cargo, and then the user may enhance the compression force on the cargo by manipulating the vertical compression force enhancement element, e.g. Note that the at least one releasable vertical compression force transfer element of the basic apparatus may have a component in a horizontal direction; the term vertical in "releasable vertical compression force transfer element" qualifies the force, not any structural element. Note that whenever it is stated that an element of the basic apparatus (or method) is or may be limited in some way, or whenever it is stated the that the basic apparatus further comprises or may further comprise additional element(s), so too may embodiments that have the elements of the basic apparatus (or method) be likewise limited.

The at least one adjustable releasable vertical compression force transfer element may comprise at least one threaded rod and threadably mated nut adjustment system (a general term for what may in at least one embodiment be part #10 as shown in FIG. 12). Wing-nut(s) may be a part of each system. The at least one adjustable releasable vertical compression force transfer element (again, which may provide what is termed coarse adjustment or positional adjustment) may comprise at least one manual mechanical elevation mechanism (a general term for what may in at least one embodiment be part #49, 50, 55, or 56), which may be at least one scissors-type jack (e.g., a type of load elevation device (or jack) that may have a scissors-type design, 55), at least one farmer jack, 50 (as the jack that may involve a lever-based ratcheting elevation is commonly known), and/or a biased expansion adjustment mechanism or element (a type of reverse clamp, e.g.; see. e.g., 56) as but three examples. Note that these types of mechanisms or elements may comprise the compression force enhancement elements; the same physical mechanism or element may be part of the adjustable releasable vertical compression force transfer element and serve as the vertical compression force enhancement element.

The at least one engagement element of the basic apparatus may be at least one frictional engagement element (a general term for what may in at least one embodiment be part #5 as shown in FIG. 4), which may be a truckbed sidewall upper lip underside engagement element (a general term for what may in at least one embodiment be part #5 as shown in FIG. 4), as but one example. A frictional engagement element engages (meaning positions (even if non-permanently) such that there is non-negligible motion with respect to the part or surface that is engaged) so that the lack of relative motion between the frictional engagement element and the surface or part that is engaged (e.g., a truckbed sidewall upper lip underside) is attributable to the oppositional forces between the two engaging surfaces and the friction that results. Other types of engagement may include belts bolts, clamping, and adhesive, e.g. The engagement element may also simply be at least one truckbed sidewall engagement element (which may or may not be frictional).

The basic apparatus may further comprise at least one pivotal connection element (a general term for what may in at least one embodiment be part #11 as shown in FIG. 12) responsive to each the at least one releasable vertical compression force transfer element and the vertically compressive cargo retention element. This pivotal connection element may be located between each vertical compression force transfer element and the vertically compressive cargo retention element and allow for relative rotational movement of the vertical compression force transfer element(s) with respect to the vertically compressive cargo retention element.

Figure 15:
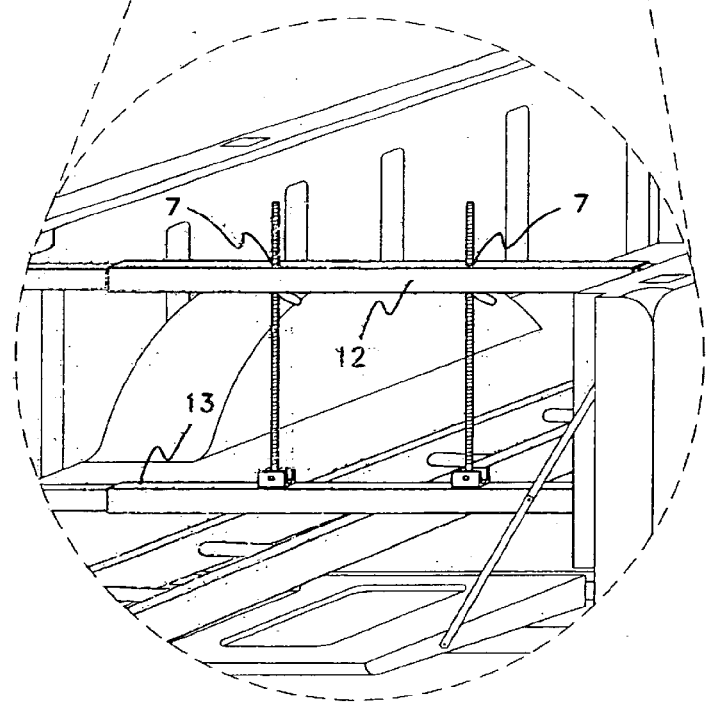
FIG. 15 shows an embodiment of the Invention holding down a post in bed of truck.
Figure 16:
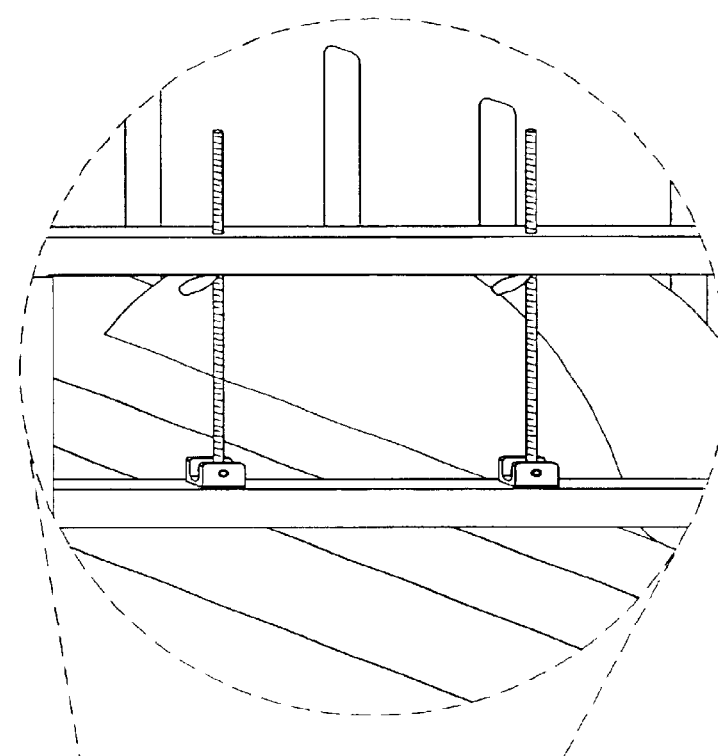
FIG. 16 shows a top view of an embodiment of the invention supporting a post.
Figure 23:
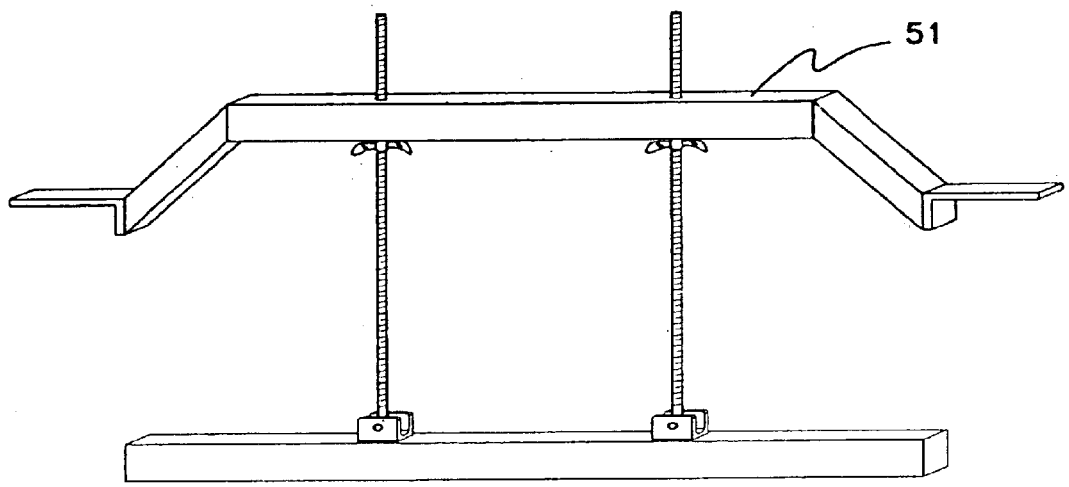
FIG. 23 shows an elevated vertical compression force base element as in at least one embodiment.
Figure 24:
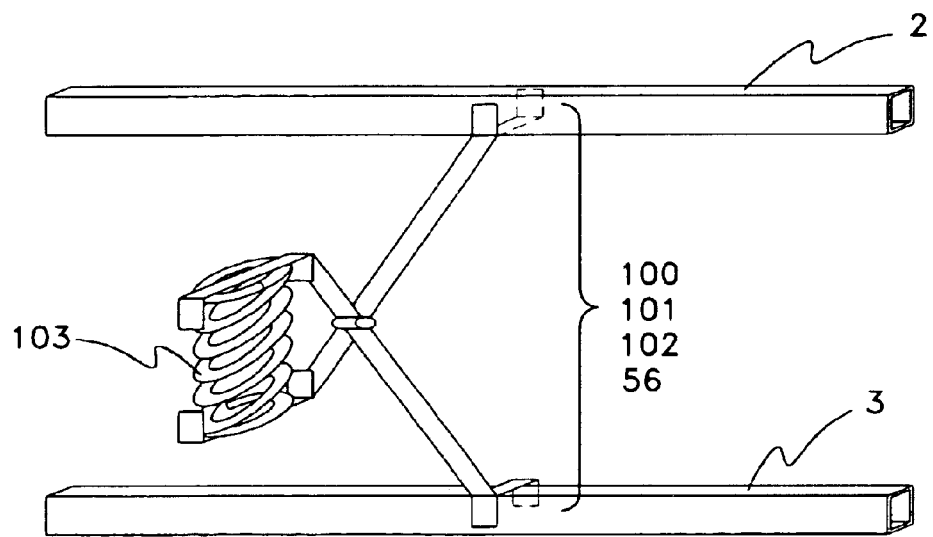
FIG. 24 shows a diagram of one embodiment of a biased expansion mechanism used as a biased expansion adjustment mechanism and a biased expansion enhancement mechanism.
Figure 25:
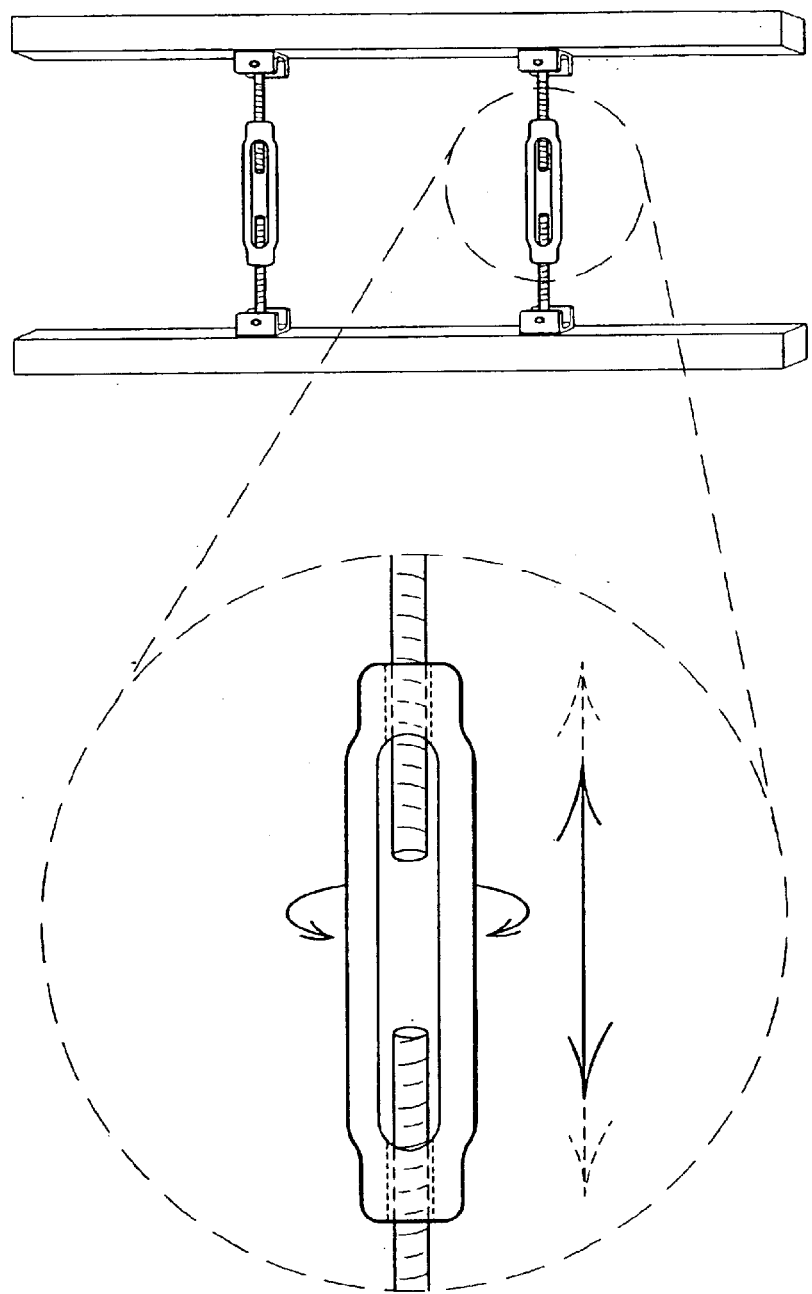
FIG. 25 shows a diagram of a turnbuckle type mechanical elevation mechanism.

The at least one vertical compression force enhancement element of the basic apparatus may comprise at least one threaded rod and threadably mated nut force enhancement system (a general term for what may in at least one embodiment be part #10 as shown in FIG. 12), which may be an at least one threaded rod and threadably mated nut adjustment system. The at least one vertical compression force enhancement element of the basic apparatus may comprise a biased expansion enhancement More generally, the at least one adjustable releasable vertical compression force transfer element may be the at least one vertical compression force enhancement element. The vertical compression force base element of the basic apparatus may be a substantially straight base element (a general term for what may in at least one embodiment be part #2 as shown in FIG. 12). Note that the term substantially indicates that designs that vary slightly (or even more than slightly) may be considered within the ambits of the coverage afforded by the limitation. The term substantially may be "read into" limitations even where the term is not explicitly mentioned. The vertical compression force base element of the basic apparatus may be a substantially elevated vertical compression force base element (a general term for what may in at least one embodiment be part 51 as shown in FIG. 23) in order to accommodate loads that, e.g., may have an upper surface that is higher than the height at which the apparatus engages a vehicle part(s), which in at least one embodiment is approximately the height of the upper surface of a truckbed sidewall. The vertical compression force base element of the basic apparatus may be an extendable (or length-adjustable) vertical compression force base element (a general term for what may in at least one embodiment be part #12 as shown in FIG. 15), which may be a positionally lockable length-adjustable vertical compression force base element. Such extension or length adjustment allows for use of the apparatus on vehicles having varying cargo transportation surface widths (such as the varying widths of differently sized pickup truck beds; note that the term length-adjust refers to the length of the element being adjusted and not the length of the truck bed). Positionally lockable refers to a capacity to be "locked" or secured in a repositioned configuration (e.g. a repositioned length).

The vertically compressive cargo retention element of the basic apparatus may be a horizontally length-adjustable vertically compressive cargo retention element (a general term for what may in at least one embodiment be part #13 as shown in FIG. 15), which may be a positionally lockable horizontally length-adjustable vertically compressive cargo retention element. Such length-adjustment may enable better retention of cargo of different widths and/or creates a better fit of the cargo retention element with the cargo supporting surface, such as a truckbed (such better fitting may enhance retention during transport, for example).

The vertical compression force cargo retention element may be an elongated squared hollow metal cargo retention element (a general term for what may in at least one embodiment be part #13 as shown in FIG. 15). The basic apparatus may further comprise rubber coating over at least a portion of exposed metal parts to mitigate rust formation, for example. Each of the at least one releasable vertical compression force transfer element may have a safety capped exposed end (here, an end is still exposed even though it may be capped) to prevent impaling injuries, for example. The vertical compression force base element of the basic apparatus may comprise at least one base element hole (a general term for what may in at least one embodiment be part #7 as shown in FIG. 15) adapted to accept the at least one vertical compression force transfer element. Through each such hole, a vertical compression force transfer element may pass; under this hole, a nut, such as a wingnut may be threadably mated on the force transfer element (if it is indeed threaded) and may be used to generate the pressure or compression force that the apparatus uses to securely retain cargo. Such a modified apparatus (having the base element hole(s)) may further comprise at least one base element hole insert that covers at least a portion of interior edge surfaces of the at least one base element hole. This hole insert may be made from a material selected from the group consisting of plastic, copper, lead, and steel, or other metal or material that is softer than the material of which the force transfer element that it surrounds and contacts is made. The basic apparatus may further comprise an anti-theft locking device. This device may prevent theft of any retained cargo and entire retention apparatus itself. The vertically compressive cargo retention element of the basic apparatus may be a frictional material bottom-coated cargo retention element (a general term for what may in at least one embodiment be part #13 as shown in FIG. 15). A texturized hard rubber strip coating is one example of a frictional material and may be sufficient to enhance cargo retention. Any of the cargo retention systems of the invention may further comprise cargo netting or a cargo net to further aid in the retention of cargo. Note that vehicle whose cargo is retained by any of the apparatus of the invention or using any of the methods of the invention is considered a part of the invention.

A basic method of retaining cargo on a vehicle may comprise the steps of: establishing cargo below a vertically compressive cargo retention element; engaging at least one vehicle part by at least one engagement element; compressively establishing a vertical compression force base element responsive to the at least one engagement element; sustaining a vertical compression force between the vertical compression force base element and the vertically compressive cargo retention element; enhancing the vertical compression force; and compressively retaining the cargo through action of the vertically compressive cargo retention element. The step of the basic method of compressively establishing a vertical compression force base element may comprise the step of adjustably establishing the vertical compression force base element, which step may comprise the step of screwedly adjustably establishing the vertical compression force base element. Screwedly adjusting refers simply to that type of adjustment that one may find with a nut and bolt or threaded rod and threadably mated nut assembly or system (note that this rod and nut system is intended to encompass any system that has a threaded rod and threadably mated nut, including, for example, a scissors type jack). The step of adjustably establishing a vertical compression force base element may comprise the step of mechanically elevating the vertical compression force base element. Mechanical elevation refers to any non-electrical elevation of the vertical compression force base element, and includes pneumatic, hydraulic, e.g., all of which are considered aspects of the invention.

The step of the basic method of engaging at least one vehicle part may comprise the step of frictionally engaging at least one vehicle part, which may comprise the step of frictionally engaging two truckbed sidewall upper lip undersides. The step of the basic method of compressively establishing a vertical compression force base element may comprise the step of length-adjusting the vertical compression force base element. The step of the basic method of sustaining a vertical compression force between the vertical compression force base element and the vertically compressive cargo retention element may comprise the step of pivotally sustaining the vertical compression force; this pivotally sustaining may merely refer to the effect of the at least one pivotal connection element. The step of the basic method of enhancing the vertical compression force may comprise the step of screwedly enhancing the vertical compression force. The step of screwedly adjustably establishing a vertical compression force base element may be the step of screwedly enhancing the vertical compression force.

The step of the basic method of compressively establishing a vertical compression force base element may comprise the step of compressively establishing an elevated base element. The step of the basic method of compressively establishing a vertical compression force base element may comprise the step of length-adjusting the vertical compression force base element; this method may further comprise the step of positionally locking the vertical compression force base element. Generally, the step of compressively establishing a vertical compression force base element may relate to fixedly positioning the base element with respect to the vehicle through use of compression.

The step of the basic method of establishing cargo below a vertically compressive cargo retention element may comprise the step of horizontally length-adjusting the cargo retention element; this method may further comprise the step of positionally locking the vertically compressive cargo retention element. The basic method may further comprise the step of rubber coating at least a portion of exposed metal parts. The basic method may further comprise the step of safety capping exposed ends of projecting parts. The step of the basic method of sustaining a vertical compression force between the vertical compression force base element and the vertically compressive cargo retention element may comprise the step of minimizing structural wear (e.g., wear on any threads that may exist on the compression force transfer element due to contact with the compression force base element) with at least one base element hole insert.

The basic method may further comprise the step of anti-theft locking the cargo, which may inherently require anti-theft locking the apparatus itself. The basic method may further comprise the step of frictionally bottom-coating the vertically compressive cargo retention element. Terms used to describe the method aspects of the invention may also be defined upon reference to their counterpart noun-form definitions existing in the apparatus description.

It is important to note the following: The phrase "configured to be responsive to" is defined so that if Part A is "configured to be responsive to" Part B, then if Part A is responsive to Part B, then Part A is, by definition, "configured to be responsive to" Part B. Further, as long as some non-negligible component of the compression force acts in a vertical direction, the compression force may be termed a vertical compression force. Further, as but an example, potential elements of claims might include, but certainly are not limited to: two length-adjusting elbows comprising a metal tube connected at end with elbow made of two pieces of flat metal; two length-adjusting braces comprising a metal tube connected at end with flat metal; an adjustment assembly comprising a Cross brace above fitting a separate Cross brace above fitting; and perpendicular Threaded brace (note that adjusters may be fitted to threaded braces).

The following construction directions may be followed as an example of constructing one type of design:

1. Take two Flat Metal pieces and weld together joined at a long end to form a 90-degree angle. Then take this newly constructed piece and weld it at the center to the end of one Square Hollow Tubing as shown in FIG. 2. Flat parts on each piece should run parallel. Repeat.

2. Take Square Hollow Metal Tubing and weld Flat Metal piece against end. Flat Metal piece should be centered, flat against end, and flat edge should run parallel to flat of Square Hollow Metal Tubing piece. Repeat.

Figure 3:
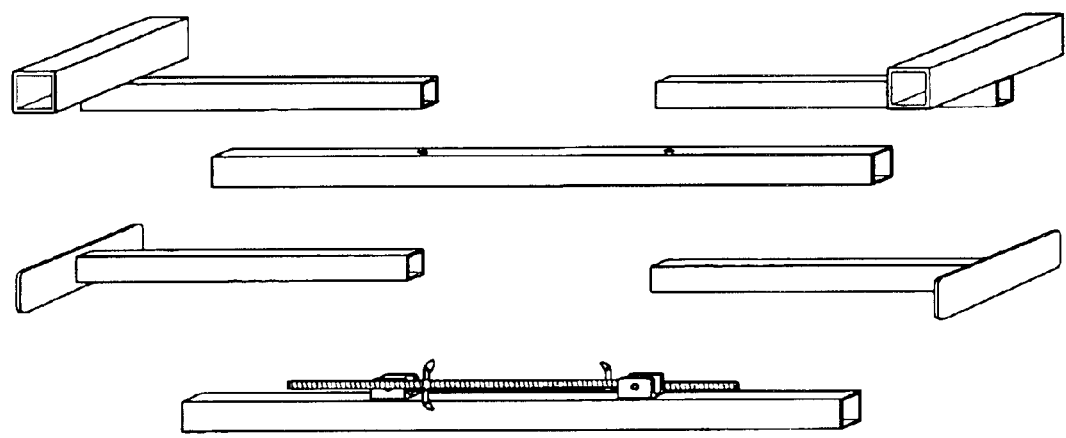
FIG. 3 shows an embodiment of the invention unassembled.

3. Take Square Hollow Metal Tubing as shown in FIG. 3 and weld Flat Metal pieces from at both ends of the two holes. Flat Metal pieces should be welded at edge of Square Hollow Metal Tubing piece.

4. Take Threaded Rod from and weld Hollow Metal Tubing piece at end perpendicularly. Piece should be centered. Repeat.

5. Take this newly constructed piece and slip Round Solid Metal Tubing into the Hollow tubing still inside Round Hollow Metal Tubing piece, weld ends of Round Solid Metal Tubing piece, between tabs made from Flat Metal pieces welded to edge of Square Hollow Metal Tubing at holes from step 3 above. Round Solid Metal Tubing should be welded centered on tabs. Repeat.

6. Place Wing Nut onto Threaded Rod and spin down leaving at least 2 inches at top. Repeat for both Threaded Rods.

7. Slip second Square Hollow Metal Tubing over the Threaded Rods through its holes until it sets on the Wing Nuts.

8. Slide one constructed piece from step 1 above into the end of Hollow Metal Tubing from step 7 above so that the top flat of the 90-degree angle sits perpendicular to the Threaded Rod. Repeat for other end of same Hollow Metal Tubing.

9. Slip Hollow Metal Tubing piece constructed in step 2 from above into end of Hollow Metal Tubing piece from step 3 above. Flat Metal on piece constructed in step two above should run perpendicular to Threaded rods. Repeat for other end of same Hollow Metal Tubing.

Modifications or improvements to basic embodiments of the invention may be as follows:

1. Rubber coating over entire (or merely a portion of) exposed areas of metal.

2. Metal caps for safety at the top portion of threaded rod ends.

3. Locking devices for horizontal bottom and top of hollow tubing so when the width of invention is adjusted to fit pick-up bed width, it will be locked in place at that width.

4. A piece of flat metal, (shaped the size of the bed of the truck, side to side and top to bottom) that can be added to the invention to change the way the invention holds items such as appliances in place.

5. Insert copper piping in the holes on top hollow square metal that threaded rod goes through to prevent stripping of threaded rod.

6. Install rubber padding or non-slip coating on the bottom hollow square to give additional protection to cargo from scratching or any other type of damage that might occur.

7. Additional changes can be made to allow usage on flat bed trailers.

8. Modifications may be made to allow adjustment for loads length-adjusting higher than the bed of the truck.

9. Possible locking system to be installed to prevent the possible theft of cargo that is left on bed of truck for prolonged periods.

As can be easily understood from the foregoing, the basic concepts of the present invention may be embodied in a variety of ways. It involves holding down cargo (or cargo retention) techniques as well as devices to accomplish the appropriate cargo retention. In this application, the cargo retention techniques are disclosed as part of the results shown to be achieved by the various devices described and as steps which are inherent to utilization. They are simply the natural result of utilizing the devices as intended and described. In addition, while some devices are disclosed, it should be understood that these not only accomplish certain methods but also can be varied in a number of ways. Importantly, as to all of the foregoing, all of these facets should be understood to be encompassed by this disclosure.

The discussion included in this nonprovisional application is intended to serve as a basic description. The reader should be aware that the specific discussion may not explicitly describe all embodiments possible; many alternatives are implicit. It also may not fully explain the generic nature of the invention and may not explicitly show how each feature or element can actually be representative of a broader function or of a great variety of alternative or equivalent elements. Again, these are implicitly included in this disclosure. Where the invention is described in device-oriented terminology, each element of the device implicitly performs a function. Apparatus claims may not only be included for the device described, but also method or process claims may be included to address the functions the invention and each element performs. Neither the description nor the terminology is intended to limit the scope of the claims which will be included in a full patent application.

It should also be understood that a variety of changes may be made without departing from the essence of the invention. Such changes are also implicitly included in the description. They still fall within the scope of this invention. A broad disclosure encompassing both the explicit embodiment(s) shown, the great variety of implicit alternative embodiments, and the broad methods or processes and the like are encompassed by this disclosure and may be relied upon in this non-provisional patent application. It should be understood that such language changes and broad claiming is herein accomplished by the applicant. The non-provisional patent application seeks examination of as broad a base of claims as deemed within the applicant's right and is designed to yield a patent covering numerous aspects of the invention both independently and as an overall system.

Further, each of the various elements of the invention and claims may also be achieved in a variety of manners. This disclosure should be understood to encompass each such variation, be it a variation of an embodiment of any apparatus embodiment, a method or process embodiment, or even merely a variation of any element of these. Particularly, it should be understood that as the disclosure relates to elements of the invention, the words for each element may be expressed by equivalent apparatus terms or method terms—even if only the function or result is the same. Such equivalent, broader, or even more generic terms should be considered to be encompassed in the description of each element or action. Such terms can be substituted where desired to make explicit the implicitly broad coverage to which this invention is entitled. As but one example, it should be understood that all actions may be expressed as a means for taking that action or as an element which causes that action. Similarly, each physical element disclosed should be understood to encompass a disclosure of the action which that physical element facilitates. Regarding this last aspect, as but one example, the disclosure of a "retention" should be understood to encompass disclosure of the act of "retaining"—whether explicitly discussed or not—and, conversely, were there effectively disclosure of the act of "retaining", such a disclosure should be understood to encompass disclosure of a "retention" and even a "means for retaining". Such changes and alternative terms are to be understood to be explicitly included in the description.

Any acts of law, statutes, regulations, or rules mentioned in this application for patent; or patents, publications, or other references mentioned in this application for patent are hereby incorporated by reference. In addition, as to each term used it should be understood that unless its utilization in this application is inconsistent with such interpretation, common dictionary definitions should be understood as incorporated for each term and all definitions, alternative terms, and synonyms such as contained in the Random House Webster's Unabridged Dictionary, second edition are hereby incorporated by reference. Finally, all references listed in the list of References To Be Incorporated By Reference In Accordance With The Patent Application or other information statement or Exhibits or Examples filed with the application are hereby appended and hereby incorporated by reference, however, as to each of the above, to the extent that such information or statements incorporated by reference might be considered inconsistent with the patenting of this/these invention(s) such statements are expressly not to be considered as made by the applicant(s).

Thus, the applicant(s) should be understood to claim at least: i) each of the surface systems as herein disclosed and described, ii) the related methods disclosed and described, iii) similar, equivalent, and even implicit variations of each of these devices and methods, iv) those alternative designs which accomplish each of the functions shown as are disclosed and described, v) those alternative designs and methods which accomplish each of the functions shown as are implicit to accomplish that which is disclosed and described, vi) each feature, component, and step shown as separate and independent inventions, vii) the applications enhanced by the various systems or components disclosed, viii) the resulting products produced by such systems or components, and ix) methods and apparatuses substantially as described hereinbefore and with reference to any of the accompanying examples, x) the various combinations and permutations of each of the elements disclosed, and xi) each potentially dependent claim or concept as a dependency on each and every one of the independent claims or concepts presented. In this regard it should be understood that for practical reasons and so as to avoid adding potentially hundreds of claims, the applicant may eventually present claims with initial dependencies only. Support should be understood to exist to the degree required under new matter laws—including but not limited to European Patent Convention Article 123(2) and United States Patent Law 35 USC 132 or other such laws—to permit the addition of any of the various dependencies or other elements presented under one independent claim or concept as dependencies or elements under any other independent claim or concept. Further, if or when used, the use of the transitional phrase "comprising" is used to maintain the "open-end" claims herein, according to traditional claim interpretation. Thus, unless the context requires otherwise, it should be understood that the term "comprise" or variations such as "comprises" or "comprising", are intended to imply the inclusion of a stated element or step or group of elements or steps but not the exclusion of any other element or step or group of elements or steps. Such terms should be interpreted in their most expansive form so as to afford the applicant the broadest coverage legally permissible.

The claims set forth in this specification by are hereby incorporated by reference as part of this description of the invention, and the applicant expressly reserves the right to use all of or a portion of such incorporated content of such claims as additional description to support any of or all of the claims or any element or component thereof, and the applicant further expressly reserves the right to move any portion of or all of the incorporated content of such claims or any element or component thereof from the description into the claims or vice-versa as necessary to define the matter for which protection is sought by this application or by any subsequent continuation, division, or continuation-in-part application thereof, or to obtain any benefit of, reduction in fees pursuant to, or to comply with the patent laws, rules, or regulations of any country or treaty, and such content incorporated by reference shall survive during the entire pendency of this application including any subsequent continuation, division, or continuation-in-part application thereof or any reissue or length-adjustment thereon.

What is claimed is:

1. A vehicular cargo retention apparatus comprising:
   a) two frictional engagement elements that each are configured to respond to a truck bed sidewall upper lip underside;
   b) a vertical compression force base element responsive to each said two frictional engagement elements;
   c) two adjustable releasable vertical compression force transfer elements, each pressuredly responsive to said vertical compression force base element; and
   d) a vertically compressive cargo retention element pressuredly responsive to each of said adjustable releasable vertical compression force transfer elements;
   e) wherein each of said two adjustable releasable vertical compression force transfer elements comprises a vertical compression force enhancement element to which said vertically compressive cargo retention element is compressively responsive,
   wherein each of said two adjustable releasable vertical compression force transfer elements is a threaded rod and threadably mated nut adjustment system,
   wherein said vertical compression force base element comprises two base element holes that each is adapted to accept a one of said two adjustable releasable vertical compression force transfer elements, and
   wherein said vehicular cargo retention apparatus, after being fixedly established to said vehicle, can be disengaged from said vehicle upon manipulation of said vertical compression force enhancement elements to remove a vertical compression force that retains cargo.

2. A vehicular cargo retention apparatus as described in claim 1 wherein said vertical compression force base element is a substantially straight base element.

3. A vehicular cargo retention apparatus as described in claim 2 wherein said vertically compressive cargo retention element is an elongated squared hollow metal cargo retention element.

4. A vehicular cargo retention apparatus as described in claim 3 wherein said substantially straight base element is a horizontally length-adjustable substantially straight base element.

5. A vehicular cargo retention apparatus as described in claim 4 further comprising two pivotal connection elements that each is responsive to a one of said two adjustable releasable vertical compression force transfer elements and said vertically compressive cargo retention element.

6. A vehicular cargo retention apparatus as described in claim 5 further comprising two base element hole inserts that each covers at least a portion of interior edge surfaces of a one of said two base element holes.

7. A vehicular cargo retention apparatus as described in claim 6 wherein said horizontally length-adjustable substantially straight base element is a positionally lockable horizontally length-adjustable base element.

8. A vehicular cargo retention apparatus as described in claim 7 further comprising an anti-theft element.

9. A vehicular cargo retention apparatus comprising:
   a) at least one frictional engagement element configured to be responsive to at least one vehicle part;
   b) a vertical compression force base element responsive to said at least one frictional engagement element;
   c) at least one releasable vertical compression force transfer element pressuredly responsive to said vertical compression force base element; and
   d) a vertically compressive cargo retention element pressuredly responsive to said at least one releasable vertical compression force transfer element,
   wherein said at least one releasable vertical compression force transfer element comprises at least one vertical compression force enhancement element to which said vertically compressive cargo retention element is compressively responsive, and
   wherein said vehicular cargo retention apparatus, after being fixedly established to said vehicle, can be disengaged from said vehicle upon manipulation of said vertical compression force enhancement element to remove a vertical compression force that retains cacao.

10. A vehicular cargo retention apparatus as described in claim 9 wherein said at least one releasable vertical compression force transfer element is at least one adjustable releasable vertical compressive force transfer element.

11. A vehicular cargo retention apparatus as described in claim 10 wherein said at least one adjustable releasable vertical compression force transfer element comprises at least one threaded rod and threadably mated nut adjustment system.

12. A vehicular cargo retention apparatus as described in claim 11 wherein said at least one threaded rod and threadably mated nut adjustment system is two threaded rod and threadably mated nut adjustment systems.

13. A vehicular cargo retention apparatus as described in claim 10 wherein said at least one adjustable releasable vertical compression force transfer element comprises at least one manual mechanical height-adjustment mechanism.

14. A vehicular cargo retention apparatus as described in claim 13 wherein said at least one manual mechanical height-adjustment mechanism is at least one scissors-type jack.

15. A vehicular cargo retention apparatus as described in claim 13 wherein said at least one manual mechanical height-adjustment mechanism is at least one farm jack.

16. A vehicular cargo retention apparatus as described in claim 9 wherein said at least one frictional engagement element is at least one truckbed sidewall upper lip underside engagement element.

17. A vehicular cargo retention apparatus as described in claim 9 wherein said at least one frictional engagement element is at least one truckbed sidewall engagement element.

18. A vehicular cargo retention apparatus as described in claim 9 further comprising at least one pivotal connection element responsive to each said at least one releasable vertical compression force transfer element and said vertically compressive cargo retention element.

19. A vehicular cargo retention apparatus as described in claim 9 wherein said at least one vertical compression force enhancement element comprises at least one threaded nut.

20. A vehicular cargo retention apparatus as described in claim 19 wherein said at least one vertical compression force enhancement element comprises two threaded rod and threadably mated nut force enhancement systems.

21. A vehicular cargo retention apparatus as described in claim 11 wherein said at least one vertical compression force enhancement element comprises at least one threaded rod and threadably mated nut force enhancement system.

22. A vehicular cargo retention apparatus as described in claim 10 wherein said at least one adjustable releasable vertical compression force transfer element is at least one biased expansion adjustment mechanism.

23. A vehicular cargo retention apparatus as described in claim 9 wherein said at least one vertical compression force enhancement element is at least one biased expansion enhancement mechanism.

24. A vehicular cargo retention apparatus as described in claim 22 wherein said at least one vertical compression force enhancement element is at least one biased expansion enhancement mechanism.

25. A vehicular cargo retention apparatus as described in claim 24 wherein said at least one biased expansion enhancement mechanism is said at least one biased expansion adjustment mechanism.

26. A vehicular cargo retention apparatus as described in claim 9 wherein said vertical compression force base element is a substantially straight base element.

27. A vehicular cargo retention apparatus as described in claim 9 wherein said vertical compression force base element is a substantially elevated vertical compression force base element.

28. A vehicular cargo retention apparatus as described in claim 9, 26, or 27 wherein said vertical compression force base element is a length-adjustable vertical compression force base element.

29. A vehicular cargo retention apparatus as described in claim 9 wherein said vertically compressive cargo retention element is a horizontally length-adjustable vertically compressive cargo retention element.

30. A vehicular cargo retention apparatus as described in claim 28 wherein said vertically compressive cargo retention element is a horizontally length-adjustable vertically compressive cargo retention element.

31. A vehicular cargo retention apparatus as described in claim 28 wherein said length-adjustable vertical compression force base element is a positionally lockable length-adjustable vertical compression force base element.

32. A vehicular cargo retention apparatus as described in claim 29 wherein said horizontally length-adjustable vertically compressive cargo retention element is a positionally lockable horizontally length-adjustable vertically compressive cargo retention element.

33. A vehicular cargo retention apparatus as described in claim 9 wherein said vertically compressive cargo retention element is an elongated squared hollow metal cargo retention element.

34. A vehicular cargo retention apparatus as described in claim 9 wherein said vertical compression force base element or said vertically compressive cargo retention element comprises exposed metal parts, and wherein said vehicular cargo retention apparatus further comprises rubber coating over at least a portion of said exposed metal parts.

35. A vehicular cargo retention apparatus as described in claim 9 wherein said vertical compression force base element comprises at least one base element hole adapted to accept said at least one releasable vertical compression force transfer element.

36. A vehicular cargo retention apparatus as described in claim 35 further comprising at least one base element hole insert that each covers at least a portion of interior edge surfaces of a one of said at least one base element hole.

37. A vehicular cargo retention apparatus as described in claim 36 wherein each said at least one base element hole insert is made from a material selected from the group consisting of plastic, copper, lead, and steel.

38. A vehicular cargo retention apparatus as described in claim 9 further comprising an anti-theft locking device.

39. A vehicular cargo retention apparatus as described in claim 9 wherein said vertically compressive cargo retention element is a frictional material bottom-coated cargo retention element.

40. A vehicle whose cargo is retained by an apparatus as in claim 10.

* * * * *